United States Patent [19]

Hornung et al.

[11] Patent Number: 4,583,756
[45] Date of Patent: Apr. 22, 1986

[54] ANTI-BUCKLING CONTROL SYSTEM FOR ARTICULATED VEHICLES

[75] Inventors: Walter Hornung, Stuttgart; Gerhard Hametner, Unterensingen; Wolfgang Ackermann, Stuttgart; Lothar Benkowitz, Hochdorf; Peter Hofmann, Stuttgart; Dieter Koch, Aichwald; Herbert Hemming, Stuttgart, all of Fed. Rep. of Germany

[73] Assignee: Daimler Benz Aktiengesellschaft, Fed. Rep. of Germany

[21] Appl. No.: 581,097

[22] Filed: Feb. 17, 1984

[30] Foreign Application Priority Data

Feb. 19, 1983 [DE] Fed. Rep. of Germany ....... 3305758

[51] Int. Cl.$^4$ .............................................. B62D 53/00
[52] U.S. Cl. ................... 280/432; 280/446 B; 280/460 R
[58] Field of Search ............... 280/432, 403, 446 R, 280/446 B, 474, 460 R; 180/139, 136, 235

[56] References Cited

U.S. PATENT DOCUMENTS

| 4,119,330 | 10/1978 | Capps | 280/432 |
| 4,344,640 | 8/1982 | Ratsko et al. | 280/432 |
| 4,405,143 | 9/1983 | Rosenkrands | 280/403 |
| 4,421,339 | 12/1983 | Hagin | 280/432 X |

FOREIGN PATENT DOCUMENTS

| 2748714 | 5/1979 | Fed. Rep. of Germany . |
| 2806751 | 8/1979 | Fed. Rep. of Germany . |
| 2945441 | 5/1981 | Fed. Rep. of Germany . |

Primary Examiner—Joseph F. Peters, Jr.
Assistant Examiner—Charles R. Watts
Attorney, Agent, or Firm—Barnes & Thornburg

[57] ABSTRACT

An anti-buckling control system is disclosed for articulated vehicles, especially articulated busses. Two double acting piston-cylinder units are interposed in the pivot connection between the forward and following vehicular units for applying resistance forces against hinged or buckling movement of the vehicular units with respect to one another. A computerized control unit is provided for controlling the hydraulic circuit for the piston-cylinder units so that they apply resistance forces tending to direct the buckling angle towards desired values determined in dependence upon the forward vehicular unit steering angle, the instantaneous buckling angle, and the vehicle velocity. The piston-cylinder units are disposed with their ends at one vehicle side closely adjacent one another and with their ends at the other vehicle side spaced from one another to form a V-shaped configuration. To increase the effectiveness of the piston-cylinder units for large buckling angles and the like, the ends thereof connected to a pivotal cross piece for supporting the following vehicle section, are disposed at the following vehicle side of the buckling pivot axis during straight driving conditions.

20 Claims, 7 Drawing Figures

ANTI-BUCKLING CONTROL SYSTEM FOR ARTICULATED VEHICLES

BACKGROUND AND SUMMARY OF THE INVENTION

The invention relates to an anti-buckling control system for steerable articulated vehicles, especially for articulated busses. Such articulated vehicles include a steerable forward wagon or unit and at least one hingedly connected following vehicular wagon or unit. The forward end of the following vehicular unit is pivotably connected about a cross axis with a cross girder or cross piece. The cross piece is pivotally borne for pivotal movement about a vertical axis at a rotary bearing support plate or table fixedly connected to the forward vehicular unit. The forward vehicular unit is further connected by means of two double acting piston-cylinder units articulatedly connected at the cross piece and the forward vehicular section in such a manner as to exhibit a V-shaped configuration when seen in the top view. The piston-cylinder units work in response to a computer operated control arrangement to forceably dampen the buckling angle between the forward and rearward vehicular units by means of exhausting and applying fluid pressure, preferably via a hydraulic medium, to the respective cylinder units.

An anti-buckling control system of the above mentioned general construction is proposed, including double acting piston-cylinder units, in the unpublished German patent application P 32 30 617.2. This construction is excellent with respect to the small space requirement needed. However, the arrangement of this application is in need of improvement in the arrangement of the piston-cylinder unit in so far as the same is articulated at the cross piece exactly inside of a vertical plane which intersects the pivot center of the cross piece. For example, if the piston-cylinder units are actuated to the buckling angle of the vehicular sections in a buckled condition of the vehicle, there is only a comparably small support moment because the axes of each piston-cylinder unit exhibits a very sharp (almost 180°) angle with respect to the radius which leads from the buckling or pivot center of the cross piece to the cross piece sided ends of the respective piston-cylinder unit. This means that the piston-cylinder units support the cross piece in the buckled or pivoted condition of the vehicle with very short effective lever arms with respect to the pivot center of the cross piece.

In German published application (DE OS) No. 29 45 441, an arrangement is disclosed which deviates from the above-mentioned construction. According to this disclosure, two piston-cylinder units are disposed parallel to one another in a straight driving position of the vehicle and the piston-cylinder units are disposed at a lateral distance from the longitudinal axis of the vehicle between the front and rear vehicular sections. This design demands a considerable construction volume. Additionally, the piston-cylinder units are connected with the vehicular section by means of connecting links or guides such that with a buckled vehicle, as a rule only the piston-cylinder unit at the inside of the curve being traversed can transfer forces in the pushing direction; a simultaneous tranfer of tension forces through the piston- cylinder unit at the curve outside is, on the other hand, excluded.

A similar arrangement is described in German published application (DE-OS) No. 29 35 437. Here again, the two piston-cylinder units are disposed parallel to one another at opposite sides of the longitudinal axis of the vehicle middle with an extended straight position of the vehicle. The piston-cylinder units are connected to one vehicular section with only one of their ends while the other ends of the units abut the other vehicular section by means of bumbers. During the driving of the vehicle through a curve and the resultant buckling of the pivoted connection between the vehicular sections, only the piston-cylinder unit at the inside of the curve facilitates the application of compression forces; on the other hand the piston-cylinder unit at the outside of the curve can transfer neither tension nor compressive forces while it is even spaced from the bumper of the following wagon.

In addition, possibilites are described in the German published application (DE-OS) No. 30 04 409 for controlling the piston-cylinder units for damping the buckling angle changes at articulated vehicles. However, this publication contains no detailed statements about the manner of the arrangement of the piston-cylinder units between the two pivotally connected vehicular sections or wagons.

An object or problem of the invention is to improve an arrangement of the above-mentioned construction so that very high support moments between the cross piece and the wagon or vehicular unit connected therewith can be transferred by means of the piston-cylinder units, while maintaining a small construction space requirement.

These objects are achieved and problems solved according to the invention by providing that the ends of the piston-cylinder units connected to the cross piece are pivotally connected at the cross piece at the following wagon side of the vertical buckling pivot axis, when the vehicle is in a straight driving condition. In preferred embodiments, the arm connecting the following wagon with the cross piece are pivotally connected at a cross axis of the cross piece extending through the vertical buckling pivot axis.

With the arrangement of the invention, the respective piston-cylinder units are connected with a relatively large lever arm with respect to the buckling pivot axis of the cross piece when the vehicle is in a buckled position with the forward and rearward vehicular units at an angle to one another. In the buckled position, the axis of the piston-cylinder unit at the curve inside side of the vehicle forms an approximately right angle with a radius extending from the buckling pivot axis to the end of said piston-cylinder unit attached at the cross piece. Consequently, correspondingly high rotational moments can be accommodated, which as a rule are experienced during strong damping of the buckling angle changes or during a blockage of the piston-cylinder units for limiting the buckling angle during the course of driving conditions with a buckled connection.

Preferably the arrangement is so constructed that the piston-cylinder unit at the curve inside side of the vehicle forms approximately a right angle with the radius from the cross piece buckling axis to the end of said piston-cylinder connected at the cross piece during maximum buckling angle permitted by the design. Such an arrangement creates an especially large supporting moment with especially large buckling angles during which the following wagon can especially easily break out of the curve inside or outside e.g. jackknife.

The piston-cylinder unit at the curve outside side of the vehicle extends approximately parallel to the longitudinal axis of the forward wagon during a driving condition of maximum design buckling angle, however without running over the dead center position. With this construction, the piston-cylinder units exhibit a relatively large piston stroke during buckling of the vehicle section, a feature which is very advantageous with respect to accurate control.

In practical embodiments, the piston-cylinder units are disposed in a plane which is parallel to the plane of the rotary plate forming the buckling pivot support and attached to the forward wagon. This arrangement precludes the transfer of forces with vertical components to the cross piece.

Furthermore, the piston-cylinder units are preferably arranged above the rotary plate buckling pivot support because on the one hand, there is relatively much space available above the rotary plate and, on the other hand, the piston-cylinder units are effectively sheltered during driving conditions.

According to an especially advantageous embodiment of the invention, the computer control system for controlling the piston-cylinder units includes a failure recognition feature and a mechanism for opening a normally closed bypass line for the blocking and connection lines of the piston-cylinder fluid medium circuit upon the occurrence of a failure. This arrangement assures safe further driving also upon failures in the control system for the articulation interlock.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

In the drawings and the following description, the vehicular sections 1 and 2 are only schematically depicted in order not to obscure the present invention. By way of background information, reference is made to U.S. Pat. Nos. 4,106,792; 4,313,615; and 4,366,966 for disclosures of an exemplary articulated vehicle which the present invention relates to.

Figure 1:
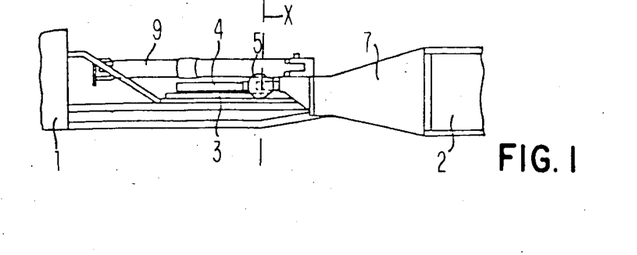
FIG. 1 is a schematic side view showing a hinged connection between a forward and following vehicular unit constructed in accordance with a preferred embodiment of the present invention.
Figure 2:
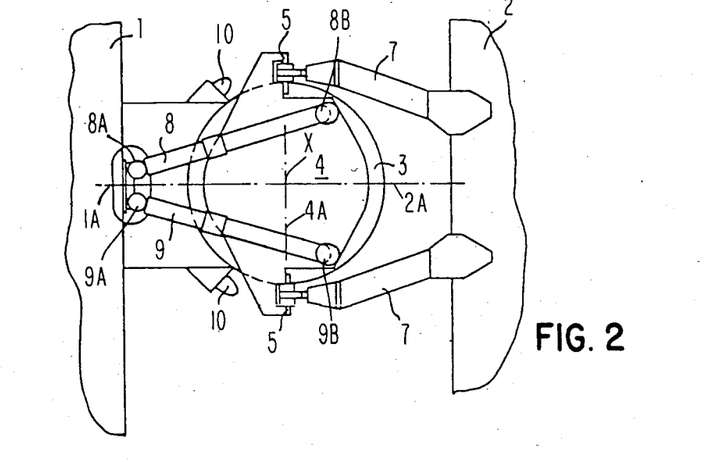
FIG. 2 is a schematic top view of the hinged connection of FIG. 1, showing the vehicular units in a non-buckled straight driving condition.
Figure 3:
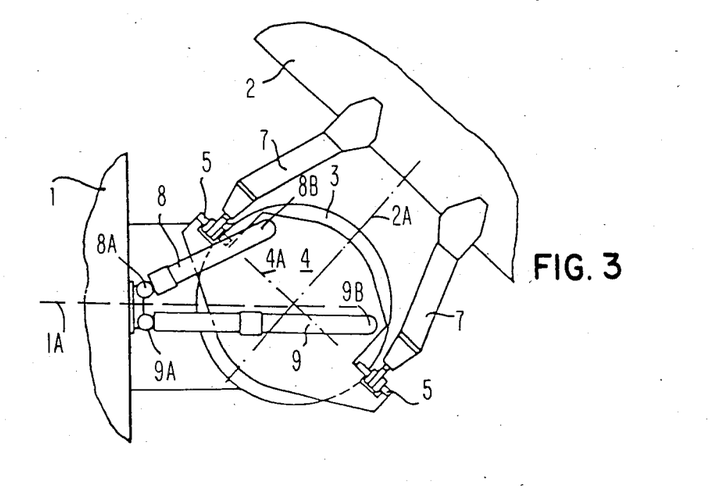
FIG. 3 is a schematic top view similar to FIG. 2, but showing the vehicular units pivoted at an angle with respect to one another.

FIGS. 1 to 3 schematically depict the hinged connection between a forward vehicular unit 1 (e.g., a four wheel bus unit having front steerable wheels) and a following vehicle unit 2 (e.g. a trailing wheeled bus section). A rotary plate or table 3 is fixedly connected to the unit 1 and forms a pivot support for cross piece 4 to pivotally move about a vertically extending buckling pivot axis X. Cross piece 4 is in turn hingedly connected at joints 5 with connecting support arms 7 connected with the frame of the following vehicle unit 2. The following unit 2 is supported in the driving direction by means of these support arms 7 connected at the cross piece 4. In the FIG. 2 illustration, the vehicular units 1 and 2 are disposed in a straight line driving condition, with their respective longitudinal axes 1A and 2A coinciding with one another. The hinged connections 5 are disposed along a cross axis 4A of the cross piece 4 extending through the hinged or buckling pivot axis X. The support arms 7 are disposed symmetrically at opposite sides of the longitudinal axis 2A of the unit 2.

Two piston-cylinder units 8 and 9 are provided for applying support forces against buckling pivoting movement of units 1 and 2 during driving conditions. These piston-cylinder units 8 and 9 are disposed symmetrically with respect to the vehicle longitudinal axis (1A, 2A) when the vehicle is in a straight ahead, non-buckled position of the units 1 and 2. Piston-cylinder unit 8 is connected by means of hinged connection 8A at the unit 1 and at the cross piece 4 at connection 8B. In a similar manner, piston-cylinder unit 9 is connected at the unit 1 via articulated connection 9A and at the carrier 4 by articulated connection 9B. The connection points 8A, 9A are disposed closely adjacent one another and the connection points 8B, 9B are spaced from one another at opposite lateral sides of the longitudinal axis 2A of the unit 2 and cross piece 4 so as to form a V-shaped configuration as seen in the top view when in the straight ahead driving condition of FIG. 2. The piston-cylinder units 8 and 9 are arranged with their axes parallel to the plane of the rotary pivot support plate 3 so that the piston-cylinder units 8 and 9 exert substantially no forces at the cross piece 4 having components perpendicular to the plane of the rotary support plate 3.

The piston-cylinder units 8 and 9 form a part of an articulated interlock system explained in more detail below, for the articulated connection between the forward vehicular unit 1 and the following vehicular unit 2 formed by the rotary support plate 3 and the cross piece 4.

The maximum achievable buckling angle for this articulated connection (rotary support plate 3 and cross piece 4) is limited only by means of the elastic bumpers 10 arranged at the rotary support plate 3 (see the illustration in FIG. 2) or at a frame fixedly connected with the rotary plate 3, which elastic bumpers cooperate with corresponding abuttments at cross piece 4.

Figure 4:
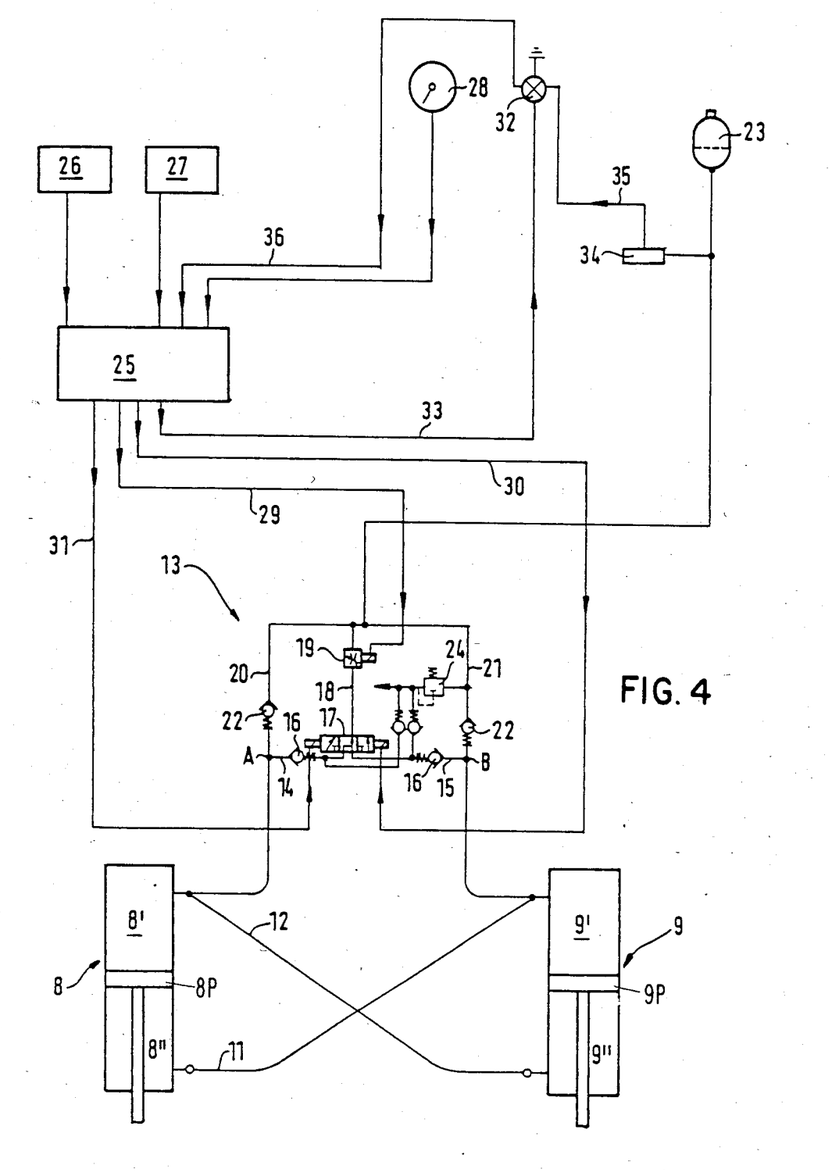
FIG. 4 is a schematic diagram showing the electrical and hydraulic circuits for controlling the piston-cylinder units at the hinged connection, constructed in accordance with a preferred embodiment of the invention.

Referring to FIG. 4, the piston-cylinder units 8 and 9 are constructed as double acting units having respective chambers 8', 8" at the opposite sides of piston 8P and chambers 9', 9" at opposite sides of piston 9P.

The chambers 8', 8", 9', 9" are cross connected as shown in FIG. 4 by means of connecting lines 11 and 12. A fluid control circuit 13 is interposed between the two lines 11 and 12 to control the emission and throttling of the exchange of fluid in these lines and the corresponding chamber 9', 8", 8', 9". With this arrangement, hydraulic medium is selectively applied to the piston-cylinder units so that when line 11 is pressurized, piston-cylinder unit 9 is lengthened and piston-cylinder unit 8 is shortened by the application of the pressure to the respective chambers 9', 8" and the exhausting of the pressure at the respective opposite sides of these piston-cylinder units via line 12. A corresponding reverse movement of the piston-cylinder units is accomplished by the application of pressure to line 12 and the exhaustion of the pressure in line 11.

The control system circuit 13 includes a connection A communicating with line 12 as well as a connection B communicating with line 11. Respective inlet lines 14, 15 extend from the connections A and B, under interposition of non-return check valves 16 to prevent return flow in the direction of the connections A and B to the inlet side of an electrically actuable blocking and control organ 17. In the position illustrated in FIG. 4, organ 17 is not activated and is disposed in a middle position communicating both inlet lines 14 and 15 with an outlet line 18.

When organ 17 is disposed in its rightward end position, it connects only the inlet line 14 with the outlet line 18, while the inlet line 15 is blocked. In a corresponding manner, when control organ 17 is in its left end position, the inlet line 15 is connected with the outlet line 18 and simultaneously the inlet line 14 is blocked.

The outlet line 18 leads to an electrically controllable hydraulic throttle device 19, behind which the outlet line 18 branches into branch lines 20 and 21, which under interposition of non-return valves 22, which block in the direction of the throttle device 19, are connected with the connections A and B. Between the non-return valves 22 and the throttle 19 there is connected a high pressure source storage tank 23, which tank 23 can receive and supply fluid such as hydraulic medium.

To prevent a disturbing over pressure, the inlet lines 14 and 15 are respectively connected with an overpressure protection valve 24 between the inlet side of the control organ 17 and the return valve 16.

The blocking and control organ 17 as well as the throttle device 19 are controlled by means of a computer 25 which is supplied with a first signal from a detector 26 which detects the instantaneous turning angle of the steered wheels of the forward vehicular unit 1, a signal from the detector 27 for detecting the instantaneous buckling or pivot angle of the joint ¾ between the forward and following units 1, 2, and a signal corresponding to the instantaneous velocity via the schematically depicted tacometer 28.

The computer control apparatus 25 adjusts the throttle device 19 by means of the schematically depicted signal line 29 in such a manner that with increasing vehicle velocity there is an increase in the throttling and with a decrease in velocity there is a decrease in the throttling effect.

The computer apparatus 25 further adjusts the position of the organ 17 via the schematically indicated control lines 30, 31 toward the left and right in dependance upon the instantaneous values received from unit 26 for the forward vehicle unit steering angle and from unit 27 depicting the buckling angle of the two units with respect to one another. In preferred embodiments, the lines 30 and 31 supply current to activate a solenoid coil or the like to move the organ 17 to the desired position. If neither of the control lines 30 and 31 are excited by the computer unit 25, the organ 17 assumes the middle position illustrated in FIG. 4, for example, return springs could be provided to return the organ 17 to the middle position in the absence of the excitation of the lines 30 or 31.

With the organ 17 in the illustrated position, the computer unit 25 controls the adjustment of the throttle device 19 so that the piston-cylinder units 8 and 9 resist the buckling moment of the vehicular units 1 and 2 in both directions, with the level of resistance being dependent upon the adjustment position of the throttle device 19. In this manner, the following vehicular unit 2 can pivot with respect to the front or forward unit 1 in both directions against damping forces applied by the piston-cylinder units 8, 9. If now the control line 30 is activated, the organ 17 is shoved toward the right so that the following vehicular unit 2 can further buckle or pivot with respect to the forward unit 1 only in one direction because then the piston of the pistons 8P is movable into its cylinder only with a simultaneous outward movement of the piston 9P. In a corresponding manner, when the control unit 25 activates the control line 31 and thereby brings the organ 17 to its left hand end position, the piston 9P can only be moved inwardly in its cylinder under a simultaneous corresponding outward movement of the piston 8P. In this way, upon activation of the control line 30 the following vehicular unit 2 can pivot further with respect to the front vehicular unit 1 toward the right, while with activation of the control line 31 only a pivoting toward the left is possible. The relative pivotal movement in the respective other direction via the articulation ¾ between the front and rear following vehicular units 1 and 2 is effectively blocked. In both cases the buckling or pivoting in a permitted direction is against a respective resistance determined by the throttling device 19.

The control unit 25 includes a failure recognition logic which cuts off the current to both control lines 30 and 31 upon the occurrence of a failure so that the organ 17 is then brought to its middle position. Simultaneously, a control lamp 32 is switched on via a control line 33. A pressure detector 34 is provided for monitoring the pressure in the hydraulic fluid system and, upon the detection of a pressure failure in the system sends a signal turning on the control lamp 32 via control line 35 and simultaneously sends a corresponding signal to the inlet line 36 of the computer control unit 25.

Figure 5:
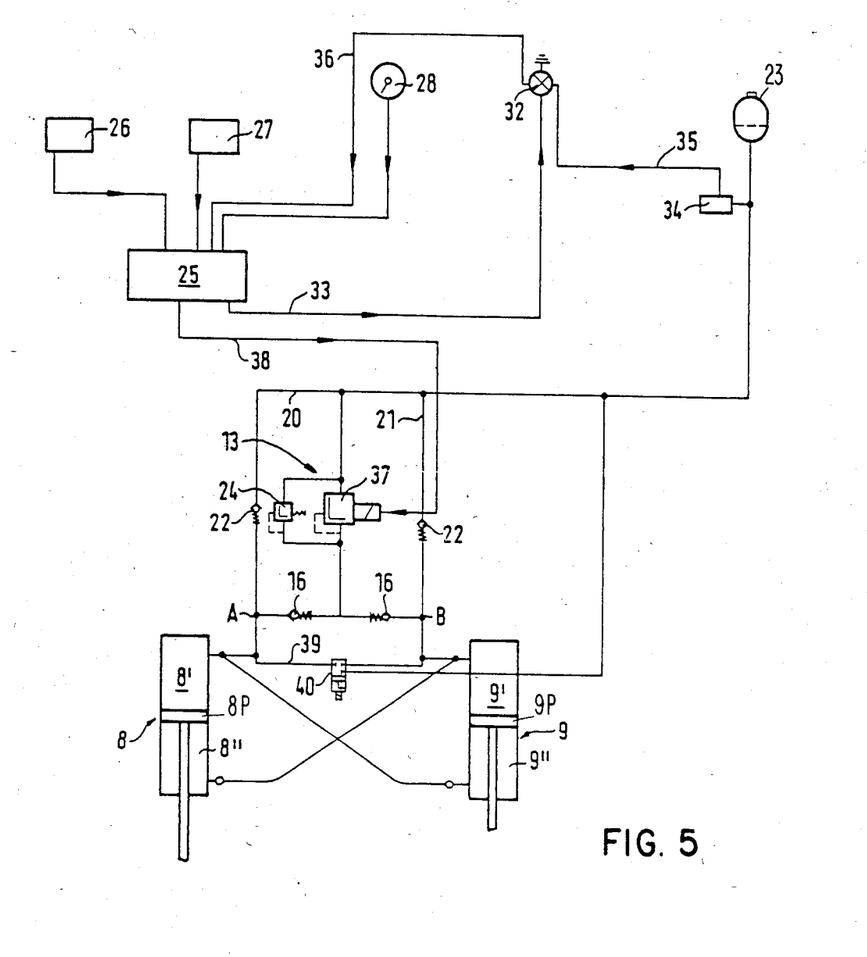
FIG. 5 is a diagram similar to FIG. 4 showing an alternative preferred embodiment of the invention.

In the FIG. 5 illustration, corresponding reference numerals are used for corresponding features as in the FIG. 4 arrangement with the above operational description being likewise applicable. The FIG. 5 embodiment differs from the FIG. 4 embodiment in that a control organ 37 is substituted for the combination of the control organ 17 and the throttling device 19 of FIG. 4. The control organ 37 is adjustably movable in a stepless manner between a condition of maximal opening and a condition of complete blocking by means of control line 38 and control device 25.

In the completely blocked condition of the control organ 37, the pistons 8P and 9P are maintained in a relatively fixed position while they can move with respect to one another against more or less strong resistance if the control organ 37 takes a position which is more or less opened. In the cases where the organ 37 is in a more or less open position, a buckling or pivoting movement of the following vehicular unit 2 toward the right or the left with respect to the front vehicular unit 1 is facilitated under correspondingly more or less stronger damping. In the first condition (organ 37 completely blocking the line), the articulation ¾ between the forward unit 1 and the following unit 2 is blocked. In the FIG. 5 arrangement a bypass line 39 is arranged parallel to the inlet lines, the branches of which bypass line 39 are normally separated from one another by means of a blocking organ 40. Upon the occurrence of a failure however, the control unit 25 can actuate the organ 40 (by means of a not illustrated control line) so that the bypass line 39 is opened and simultaneously connected with the storage 23. Under these last mentioned conditions, the pistons 8P and 9P of the piston-cylinder units 8 and 9 are freely movable independently of the position of the control organ 37.

In the arrangement of FIG. 4 and the arrangement of FIG. 5, the control unit 25 can permit or prevent a variable buckling movement of the trailing unit 2 by means of control of the organ 17 and throttling device 19 of the FIG. 4 arrangement or control organ 37 of the FIG. 5 arrangement.

In the simplest case, the control unit 25 adjusts the steering angle dependent maximum value of the buckling angle which still provides for skid-free driving of the vehicle during a respective constant turning angle (constant turning angle of the steered wheels of the forward unit 1).

Figure 7:
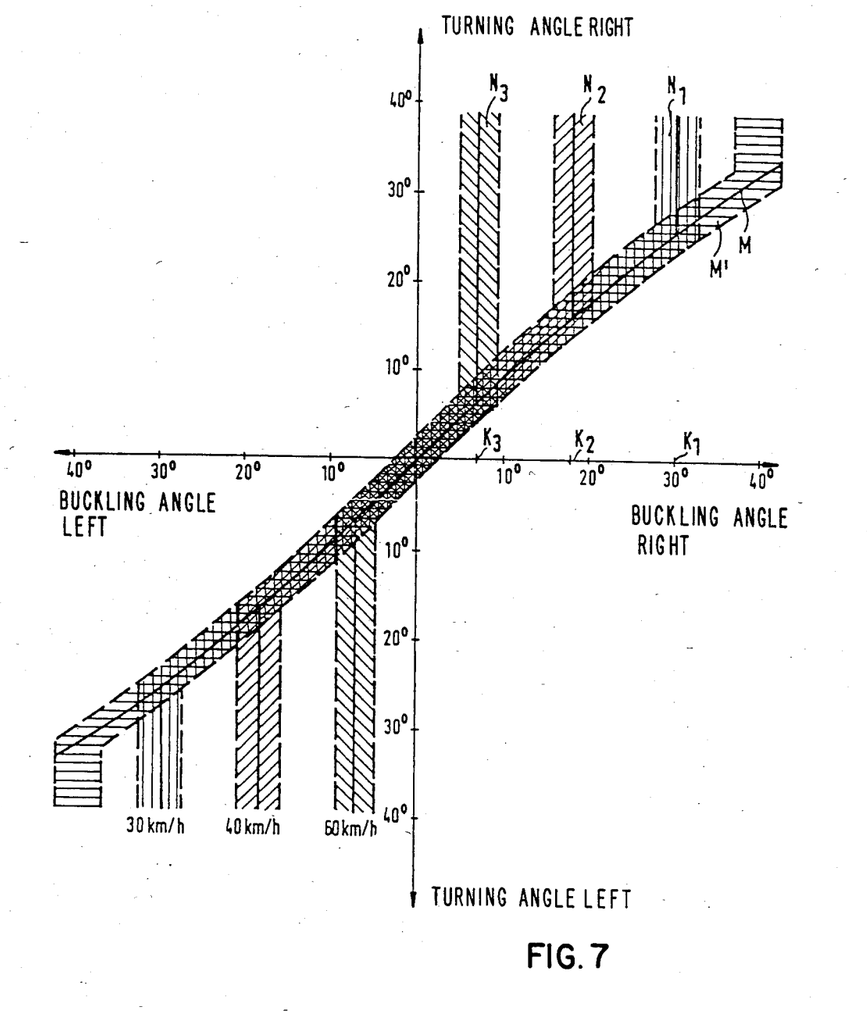
FIG. 7 is a diagram graphically depicting the maximal and limit values of the buckling angle in dependance on the forward vehicle turning angle and/or the vehicle velocity.

FIG. 7 includes a curve M representing the relationship of this maximum value to the steering turning angle. As long as the measured values of the buckling angle and the steering angle is disposed inside of one of the striped shaped regions M' of the curve M, the control unit 25 permits relatively free counter movements of the pistons 8P, 9P of the piston-cylinder units 8, 9, whereby the throttling device 19 or the control organ 37 is adjusted only with increasing velocity in the direction of an increasing throttle effect. Thereby a more or less strong pivoting movement of the following vehicular unit 2 to both sides is facilitated. If the detected values of the steering angle and buckling angle are outside of the region M', the control organ 17 will be adjusted to its right or left position, respectively, the control organ 37 will have its opening adjusted, so that only such movement of the pistons 8A, 9A are permitted wherein the following vehicular unit 2 can pivot exclusively in a single direction, by which the value pair of the turning angle and buckling angle approaches the region M' depicted on graph of FIG. 7.

Figure 6:
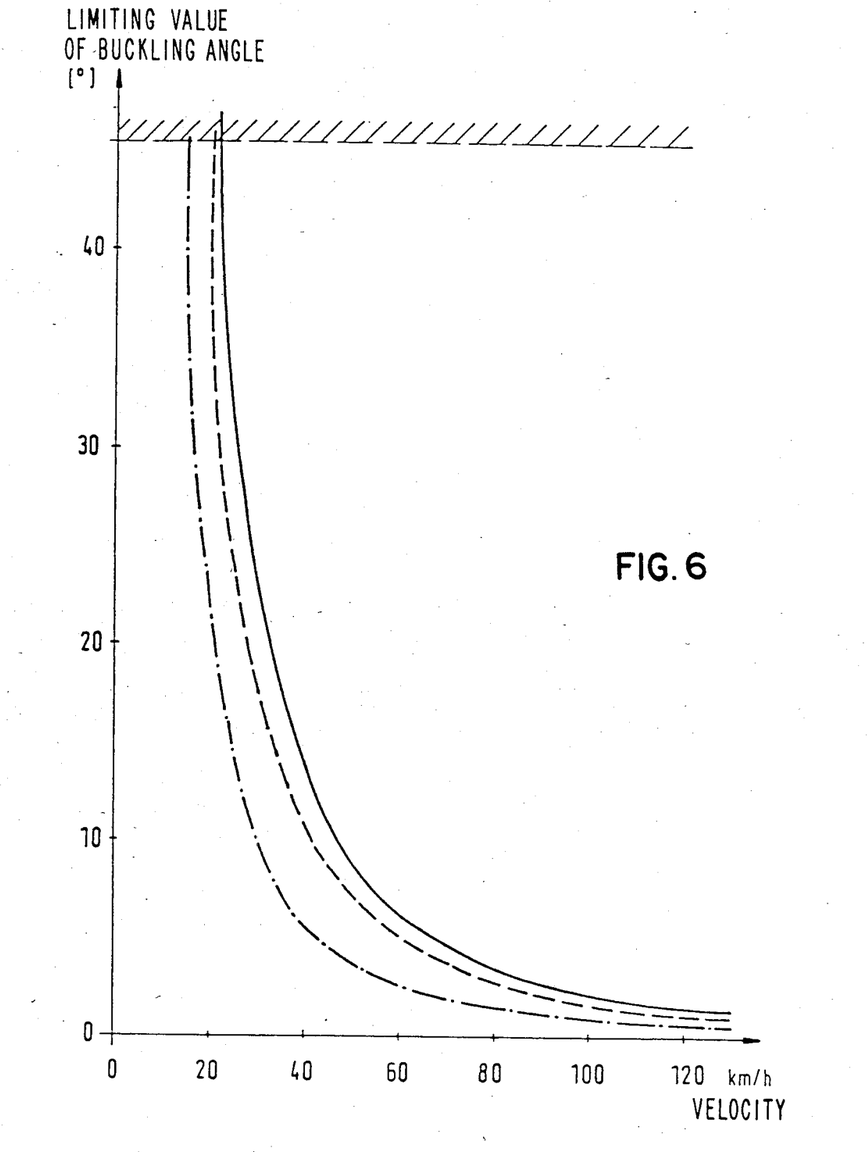
FIG. 6 is a diagram graphically depicting the achievable buckling angles in dependence on the velocity and differently achieved cross acceleration and essentially skid free driving condition.

Because of limitations in the road surface adhesion, a vehicle can be only limitedly accelerated in the cross direction of the vehicle, meaning that sharp curves can only be traveled with reduced velocity while curves with large radii can be traversed at higher velocities. This also means that the measured value of the buckling angle for essentially skid-free driving must be below the velocity dependent limiting value. This is graphically depicted in FIG. 6 for differently achievable cross accelerations. The control unit 25 can consider this information—comparing further with FIG. 7—in that it considers the velocity in permitting buckling movement of the following vehicle unit 2 toward the right or left, if the detected steering angle and buckling angle are disposed with respective velocity inside of the stripe shaped zones $N_1$, $N_2$ respectively $N_3$, whereby the increasing index corresponds to increasing velocity. If the combination of the turning angle and buckling angle values lie outside of these zones, the control unit permits only such buckling movements by means of the corresponding control of the fluid control circuit 13 (compare FIGS. 4 and 5) by which the measured value approaches toward the mentioned zones $N_1$ to $N_3$. Also if the steering, in the case of the zone of $N_2$, is turned more than approximatley 20° toward the right or the left, the computer unit 25 seeks by means of the control circuit 13 to have the following vehicular unit 2 approach a buckling angle which is in the region of the limiting value $K_2$. The corresponding is true for the limiting values $K_1$, respectively $K_3$, if the vehicle travels with the indicated velocities of one of the zones $N_1$, respectively $N_3$.

In an especially advantageous manner the control unit 25 determines from the instantaneous changes of the steering angle as well as the vehicle velocity, respectively, the vehicle velocity changes, a desired value of the buckling angle. This desired buckling angle is adjusted according to the previously traveled path and the steering angle changes whereby the fluid control circuit 13 is activated in such a manner that the following vehicular unit 2 approaches toward the respective desired value of the buckling angle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Anti-buckling control system for steerable articulated vehicles of the types having a first vehicular section hingedly connected to a second vehicular section, comprising:

pivot support means fixedly arranged at the first vehicular section, cross piece means pivotally supported at the pivot support means for pivotal movement about a vertical buckling axis, connecting arm means carried by the second vehicular section, cross piece pivot connection means pivotally connecting the connecting arm means to the cross piece means at a horizontal pivot axis of the cross piece means, first and second lengthwise adjustable control devices, said first control device being connected to the first vehicular section at a first control device connection joint and to the second vehicular section at a second control device connection joint, said second control device being connected to the first vehicular section at a third control device connection joint and to the second vehicular section at a fourth control device connection joint, and control means for forcibly adjusting the length of the first and second control devices to resist relative pivotal movement of the cross piece means and the pivot support means, wherein said first and third control device connection joints are disposed closely adjacent one another and said second and fourth control device connection joints are spaced from one another so that said control devices exhibit a V-shaped configuration open toward and the second vehicular section when said first and second vehicular sections are in a straight driving condition, and wherein the second and fourth control device connection joints are disposed at the second vehicular section side of a vertical plane extending laterally through the vertical buckling axis when the first and second vehicular sections are in a straight driving condition said second and fourth control device connection joints being disposed at the second vehicular section side of said vertical plane for enhanced resistance to larger rotational moments about said buckling axis.

2. System according to claim 1, wherein the first vehicular section is forward of the second vehicular section during normal forward vehicle driving conditions.

3. System according to claim 2, wherein the first and second control devices are respective double acting fluid medium actuatable piston-cylinder units.

4. System according to claim 3, wherein the first and second control devices are disposed symmetrically with respect to the vehicle logitudinal axis when the first and second vehicular sections are in a straight driving condition.

5. System according to claim 4, wherein said control means includes computerized control devices for processing signals indicative of driving conditions and for automatically controlling actuation of said first and second control devices in dependance on said driving conditions.

6. System according to claim 4, wherein the connecting arm means includes a pair of connecting arms connected to said cross piece means at positions laterally outside of the second and fourth control device connection joints when the first and second vehicular sections are in a straight driving condition.

7. System according to claim 1, wherein the connecting arm means includes a pair of connecting arms connected to said cross piece means at positions laterally outside of the second and fourth control device connection joints when the first and second vehicular sections are in a straight driving condition.

8. System according to claim 7, wherein the connection positions for the connecting arm means are disposed in a plane extending through the vertical buckling axis of the cross piece means.

9. System according to claim 6, wherein the connection positions for the connecting arm means are disposed in a plane extending through the vertical buckling axis of the cross piece means.

10. System according to claim 1, wherein the second and fourth control device connection joints are disposed so that, during relative pivoting of the first and second vehicular sections while driving through a curve or the like, the respective control device connection joint of said second and fourth joints disposed at the curve inside side is disposed the same distance from a plane of the vertical buckling axis for conditions of maximum design buckling angle and zero buckling angle.

11. System according to claim 1, wherein the control device connection joints are disposed so that, during relative pivoting of the first and second vehicular sections while driving through a curve or the like the respective control device at the curve inside side is extended in a direction approximately at a right angle with respect to a radius extending from the vertical buckling axis to the connection joint of the second vehicular section at the curve inside side when the vehicular sections are orientated in the maximum design buckling angle of the vehicle.

12. System according to claim 10, wherein the control device connection joints are disposed so that, during relative pivoting of the first and second vehicular sections while driving through a curve or the like the respective control device at the curve inside side is extended in a direction approximately at a right angle with respect to a radius extending from the vertical buckling axis to the connection joint of the second vehicular section at the curve inside side when the vehicular sections are orientated in the maximum design buckling angle of the vehicle.

13. System according to claim 1, wherein the control device connection joints are disposed so that, during relative pivoting of the first and second vehicular sections while driving through a curve or the like, the respective control device at the curve outside side is extended in a direction approximately parallel to the longitudinal axis of the first vehicular section.

14. System according to claim 12, wherein the control device connection joints are disposed so that, during relative pivoting of the first and second vehicular sections while driving through a curve or the like, the respective control device at the curve outside side is extended in a direction approximately parallel to the longitudinal axis of the first vehicular section.

15. System according to claim 1, wherein the axes of the control devices extend in a plane perpendicular to the vertical buckling axis.

16. System according to claim 10, wherein the axes of the control devices extend in a plane perpendicular to the vertical buckling axis.

17. System according to claim 14, wherein the axes of the control devices extend in a plane perpendicular to the vertical buckling axis.

18. System according to claim 1, wherein the control devices are disposed above the pivot support means.

19. System according to claim 18, wherein the pivot support means is a rotary plate.

20. System according to claim 5, wherein elastic bumper means are provided at at least one of the pivot support means and the cross piece means for limiting the maximum relative buckling movement of the vehicular sections, especially in the event of a detected failure in the system resulting in opening of a normally closed bypass line of the fluid circuit for the control devices.

* * * * *